(12) United States Patent
Wysocki et al.

(10) Patent No.: US 8,214,648 B2
(45) Date of Patent: *Jul. 3, 2012

(54) SECURE CONFIGURATION OF A COMPUTING DEVICE

(75) Inventors: Christopher R. Wysocki, Los Gatos, CA (US); Alan Ward, Thornton, CO (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/878,201

(22) Filed: Sep. 9, 2010

(65) Prior Publication Data

US 2011/0007895 A1  Jan. 13, 2011

Related U.S. Application Data

(63) Continuation of application No. 11/191,133, filed on Jul. 26, 2005, now Pat. No. 7,809,949.

(51) Int. Cl.
*H04L 9/32* (2006.01)

(52) U.S. Cl. .............. 713/181; 709/223; 726/3; 705/52; 705/59

(58) Field of Classification Search .................. 713/180, 713/181
See application file for complete search history.

(56) References Cited

U.S. PATENT DOCUMENTS

| | | | |
|---|---|---|---|
| 5,774,551 A | 6/1998 | Wu et al. | |
| 5,974,454 A | 10/1999 | Apfel et al. | |
| 6,233,687 B1 * | 5/2001 | White | 726/3 |
| 6,314,566 B1 | 11/2001 | Arrouye et al. | |
| 6,434,695 B1 | 8/2002 | Esfahani et al. | |
| 6,615,355 B2 | 9/2003 | Mattison | |
| 6,628,314 B1 | 9/2003 | Hoyle | |
| 6,647,494 B1 | 11/2003 | Drews | |
| 6,715,075 B1 * | 3/2004 | Loukianov | 713/176 |
| 6,789,255 B1 | 9/2004 | Pedrizetti et al. | |
| 7,003,667 B1 | 2/2006 | Slick et al. | |
| 7,114,021 B2 | 9/2006 | Seshadri | |
| 7,386,877 B2 | 6/2008 | Winiger et al. | |
| 7,395,551 B2 | 7/2008 | Watanabe | |
| 7,809,949 B2 | 10/2010 | Wysocki et al. | |

(Continued)

FOREIGN PATENT DOCUMENTS

EP  0778512 A2  6/1997

(Continued)

OTHER PUBLICATIONS

Are SHA-1 Devices Still Secure Enough| http://pdfserv.maxim-ic.com/en/an/AN3522.pdf↑Maxim Integrated Products↑May 19, 2005.*

(Continued)

*Primary Examiner* — Thanhnga B Truong
*Assistant Examiner* — Mahfuzur Rahman

(57) ABSTRACT

In accordance with a broad aspect, a method is provided to securely configure a computing device. A configuration indication is received into the computing device, including receiving a digital signature generated based on the configuration indication. Generation of the digital signature accounts for a unique identifier nominally associated with the computing device. The received configuration indication may be verified to be authentic including processing the unique identifier, the received configuration indication and the received digital signature. The computing device may be operated or interoperated with in accordance with the received configuration indication. In one example, a service interoperates with the computing device. For example, the computing device may be a portable media player, and the service may provide media to the computing device based on a capacity indication of the configuration indication.

20 Claims, 6 Drawing Sheets

Overview of Architecture

U.S. PATENT DOCUMENTS

| | | | |
|---|---|---|---|
| 7,975,147 | B1 | 7/2011 | Qumei |
| 2002/0049679 | A1 | 4/2002 | Russell et al. |
| 2003/0167409 | A1 | 9/2003 | Sussman |
| 2004/0038675 | A1 | 2/2004 | Criss et al. |
| 2004/0039911 | A1* | 2/2004 | Oka et al. ................. 713/175 |
| 2004/0167859 | A1* | 8/2004 | Mirabella ................. 705/59 |
| 2004/0193550 | A1 | 9/2004 | Siegel |
| 2004/0215735 | A1 | 10/2004 | Nakahara et al. |
| 2004/0243994 | A1 | 12/2004 | Nasu |
| 2005/0004875 | A1* | 1/2005 | Kontio et al. ................. 705/52 |
| 2005/0044481 | A1 | 2/2005 | Collart |
| 2005/0071839 | A1 | 3/2005 | Kim et al. |
| 2005/0144437 | A1* | 6/2005 | Ransom et al. ................. 713/151 |
| 2005/0144465 | A1 | 6/2005 | Senshu |
| 2005/0278787 | A1 | 12/2005 | Naslund et al. |
| 2006/0026304 | A1 | 2/2006 | Price |
| 2006/0107071 | A1 | 5/2006 | Girish et al. |
| 2007/0028109 | A1 | 2/2007 | Wysocki et al. |
| 2007/0028120 | A1 | 2/2007 | Wysocki et al. |

FOREIGN PATENT DOCUMENTS

| | | |
|---|---|---|
| EP | 1 091 285 A2 | 4/2001 |
| EP | 1 460 514 A | 9/2004 |
| EP | 1 659 810 A | 5/2006 |
| WO | WO 98/07085 A | 2/1998 |
| WO | WO 03/088699 A | 10/2003 |
| WO | WO 2004/075092 | 9/2004 |

OTHER PUBLICATIONS

Gkantsidis et al., "Planet Scale Software Updates", ACM SIGCOMM Computer Communication Review, Oct. 2006, Proceedings of the 2006 conference on Applications, technologies, architectures, and protocols for computer communications, vol. 36, Issue 4, pp. 423-434.
International Search Report and Written Opinion for corresponding PCT application No. PCT/US2006/029159, dated Nov. 26, 2006.
Office Action for U.S. Appl. No. 11/191,133 dated Feb. 20, 2009.
Office Action for U.S. Appl. No. 11/191,133 dated Jul. 30, 2009.
Advisory Action for U.S. Appl. No. 11/191,133 dated Oct. 26, 2009.
Office Action for U.S. Appl. No. 11/191,133 dated Dec. 4, 2009.
Notice of Allowance for U.S. Appl. No. 11/191,133 dated Jun. 3, 2010.
Office Action for U.S. Appl. No. 11/191,133, dated Feb. 20, 2009.
Final Office Action for U.S. Appl. No. 11/191,133 dated Jul. 30, 2009.
Office Action for U.S. Appl. No. 11/191,133, dated Dec. 4, 2009.
Notice of Allowance for U.S. Appl. No. 11/191,133 dated Jun. 3, 2010.

* cited by examiner

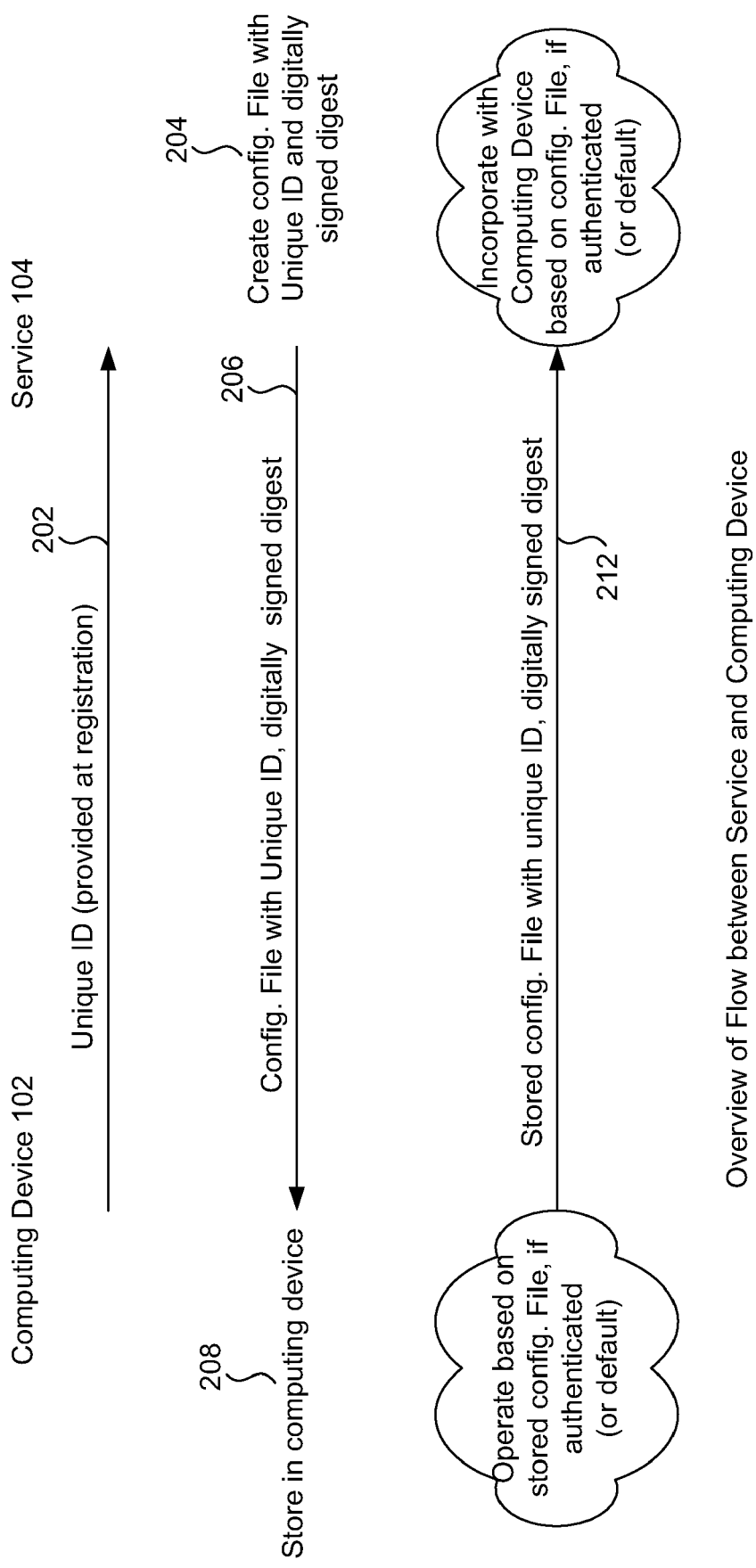

Create Signed Config File

Authenticate Signed Config. File

Memory Organization of Computing Device

Preparation for Failure Scenario

SECURE CONFIGURATION OF A COMPUTING DEVICE

CROSS REFERENCE TO RELATED APPLICATIONS

This application is a continuation of U.S. patent application Ser. No. 11/191,133, filed Jul. 26, 2005 now U.S. Pat. No. 7,809,949, entitled "CONFIGURATION OF A COMPUTING DEVICE IN A SECURE MANNER," and incorporated herein by reference for all purposes.

This application is also related to U.S. application Ser. No. 11/190,735, filed Jul. 26, 2005, and entitled "SECURE SOFTWARE UPDATES," and incorporated herein by reference for all purposes. This application is also related to U.S. patent application Ser. No. 10/988,054, filed Nov. 12, 2004 and entitled "METHOD AND SYSTEM FOR UPDATING FIRMWARE STORED IN NON-VOLATILE MEMORY," and incorporated herein by reference for all purposes.

TECHNICAL FIELD

The present invention is in the field of utilizing a service to configure a computing device and, in particular, relates to using the service to configure the computing device in a secure manner such that the computing device may be operated or interoperated with in accordance with the configuration.

BACKGROUND

It is known to interoperate computing devices in conjunction with a service. For example, a portable media player may operate in conjunction with a "service" that includes a client computing device operating a media management application, and the media management application may operate in conjunction with service-based functionality such as a media store and, possibly, a related commerce function. This is the general architecture in which digital media players operate (e.g., iPod™ media players).

It is desirable to be able to securely configure the operation of the computing device.

SUMMARY

In accordance with a broad aspect, a method is provided to securely configure a computing device. A configuration indication may be received into the computing device, including receiving a digital signature generated based on the configuration indication. Generation of the digital signature accounts for a unique identifier nominally associated with the computing device. The received configuration indication may be verified to be authentic including processing the unique identifier, the received configuration indication and the received digital signature. The computing device may be operated or interoperated with in accordance with the received configuration indication.

In one example, a service may interoperate with the computing device. The configuration indication and digital signature may be provided from the computing device to the service, and the service may interoperate with the computing device in accordance with the configuration indication and the digital signature. For example, the computing device may be a portable media player, and the service may provide media to the computing device based on a capacity indication of the configuration indication.

BRIEF DESCRIPTION OF FIGURES

FIG. 2 provides more detail of the interaction between the computing device and the service illustrated in FIG. 1.

FIG. 3-1 describes processing associated with the service and usable to create the signed configuration file, as well as processing usable to authenticate the absence of tampering with the configuration file.

FIG. 3-2 describes processing associated with the computer device and/or the service to authenticate the absence of tampering with the configuration file.

DETAILED DESCRIPTION

It is desirable to securely configure a media player or other computing device via a service. Broadly speaking, in accordance with one aspect, the configuration operation is data-driven such that configuration data is provided to the computing device, as opposed to providing updated executable instructions to the computing device. A result of the configuration operation is to configure the operation of the computing device and/or configuring interoperation with the computing device.

Figure 1:
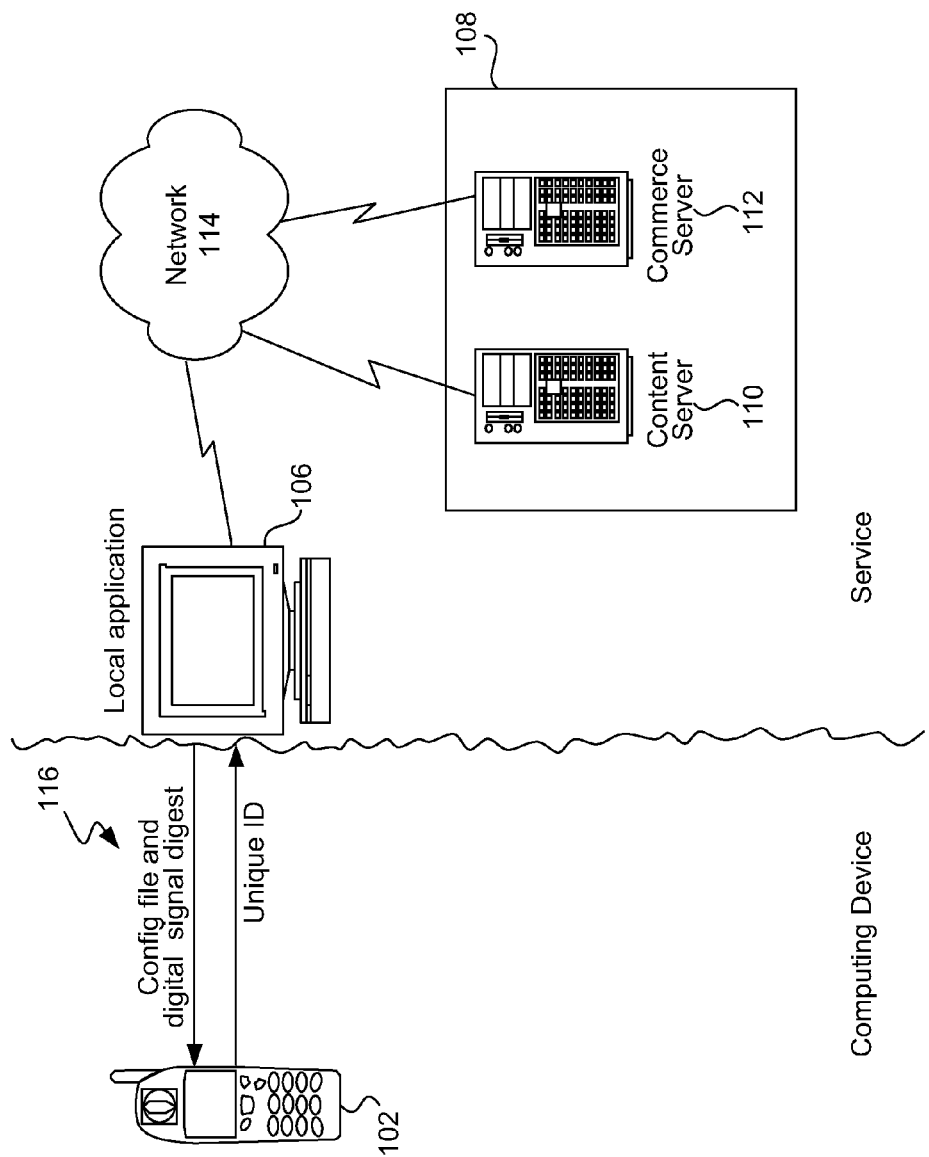
FIG. 1 illustrates an architectural overview of a system including a computing device and a service.

FIG. 1 illustrates an architectural overview of a system including a computing device 102 and a service 104. The computing device 102 may be, for example, a portable media player. The service may include a client device 106 executing a local application and interoperating with server functionality 108, such as a content server 110 and a commerce server 112, via a network 114 such as the Internet.

As shown in FIG. 1, the computing device 102 is connectable to the service 104 via a connection 116. It is via the connection 116 that the service 104 provides configuration data to the computing device 102. Particular mechanisms for providing and utilizing the configuration data are described with reference to later figures. However, in general, the computing device 102 provides a unique identifier to the service 104. For example, the computing device 102 may be a mobile telephone and the unique identifier may be a well-known Electronic Serial Number (ESN) or International Mobile Equipment Identifier (IMEI), hard-coded into a mobile telephone and by which the mobile telephone is uniquely identified.

The service 104 provides a collection of configuration data (referred to here as a "file" for ease of reference, but not implying any particular organization of the configuration data) to the computing device 102. A digital signature is provided to the computing device 102 via the connection 116 in association with the configuration data file. The digital signature is usable to verify the authenticity of the configuration data, including that the configuration data has not been modified since being generated and digitally signed and that the configuration data has been properly generated for use by the computing device having the particular unique identifier.

Figures 1, 3:
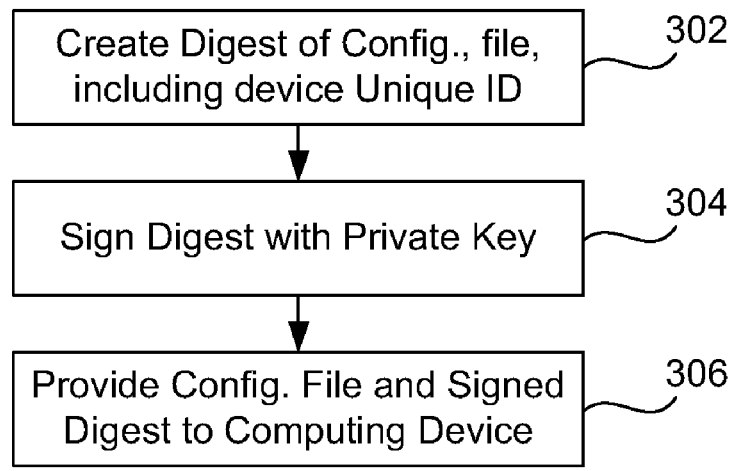
Figures 2, 3:
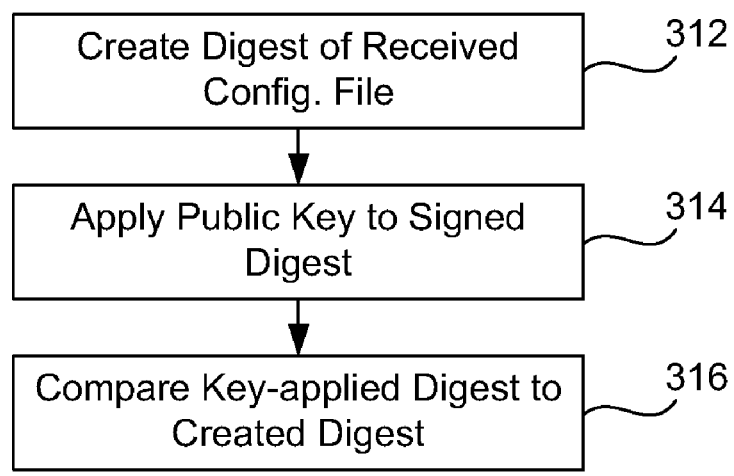

FIG. 2 provides more detail of the interaction between the computing device 102 and the service 104. The arrow labeled 202 represents the computing device 102 providing the unique identifier to the service 104. At 204, processing associated with the service 104 creates the configuration file including data representing the desired configuration for the computing device 102. Furthermore, processing associated with the service 104 creates a digest of the configuration file. In addition, processing associated with the service 204 digitally signs the digest using a private key of a public/private key pair.

The arrow labeled 206 represents the service 104 providing the configuration file, and the associated digitally-signed digest, to the computing device 102. In some examples, there is processing associated with the service 104, prior to creating the configuration file or, at least, prior to providing the configuration file to the computing device 102, to verify entitlement by the computing device 102 to be configured in accordance with the configuration file.

Referring back to FIG. 1, this may include, for example, the local application on the client computing device 106 interacting with the commerce server 108 to accept payment in exchange for entitling the computing device 102 to be configured in accordance with the configuration file. For example, the configuration may include a feature upgrade. This is discussed in greater detail later, with reference to FIG. 4.

Returning now to FIG. 2, reference numeral 210 represents the computing device operating based on the stored configuration file. Furthermore, the arrow labeled 212 represents the computing device 102 providing the configuration file and associated unique identifier, along with the digitally-signed digest, back to the service 104. The reference numeral 214 represents the service 104 interoperating with the computing device 104 based on the configuration file provided from the computing device 102.

At 210 in FIG. 2, a condition of the computing device 102 operating based on the stored configuration file is that it is verified that the configuration file is authenticated as not being tampered with since being generated by processing associated with the service 104. Likewise, at 214 in FIG. 2, a condition of the service 104 interoperating with the computing device 102 based on the configuration file provided from the computing device 102 is that the configuration file is authenticated as not being tampered with since being generated by processing associated with the service 104.

As mentioned earlier, the configuration referred to in this patent application is data driven, and the configuration file includes an indication of the unique identifier associated with the computing device 102. In one example, the configuration file represents an XML-based file of key/value pairs, where one of the key/value pairs is the unique identifier associated with the computing device 102. The configuration file may be a binary-encoded file (such as a binary-encoded XML file.)

We now refer to FIG. 3-1, which describes processing associated with the service 104 and usable to create the signed configuration file, as well as processing usable to authenticate the absence of tampering with the configuration file. At step 302, a digest of the configuration file is generated (e.g., using a hash algorithm such as MD5 or SHA-1). At step 304, the digest is encrypted (e.g., using an algorithm such as the RSA algorithm) using a private key associated with the service 104. At step 306, the configuration file and the encrypted digest are provided to the computing device 102.

FIG. 3-2 describes processing associated with the computer device 102 and/or the service 104 (as described in greater detail below) to authenticate the absence of tampering with the configuration file. At step 312, a digest is created of the configuration file. At step 314, the public key (nominally corresponding to the private key associated with the service 104, used to create encrypt the digest) is applied to the signed digest. At step 316, the digest created at step 312 is compared to the result of step 314. If these are the same, then this is evidence not only that that the configuration file has not been tampered with since being signed, but also that the configuration file was signed using the private key to which the public key (step 314) corresponds.

We now describe a particular use of the FIG. 2 flow described above, with reference to FIG. 4 (and also to the architecture overview illustrated in FIG. 1). In the particular use, it is desired to configure the computing device 102 to be upgraded in a particular manner. For example, as referred to in the Background, the computing device 102 may be a portable media player (such as an iPod™ media player, from Apple Computer), and the service includes a client computing device operating a media management application (such as, for example, the iTunes™ program). Among other things, the media management application operates to download songs to the portable media player. The media management application operates in conjunction with a media store (e.g., in FIG. 1, the content server 110) to obtain songs and may also operate in conjunction with a commerce server (in FIG. 1, the commerce server 112) to process payment for the songs. In some examples, songs need not be obtained from the media store but may be obtained from other sources, such as from "ripping" a compact disc.

In the example, the portable media player computing device 102 is configured to have a particular initial song-holding capacity. For example, the portable media player may be configured to hold twenty-five songs. In particular, a default configuration may be hard-coded into the portable media player computing device 102 or the configuration file in the portable media player may include data representing that the capacity of the portable media player is twenty-five songs. Thus, for example, if the configuration file is an XML file, the "key" may be "song capacity" and the corresponding value may be "twenty-five." (In some examples, in the absence of data in the configuration file representing the capacity, the portable media player operates according to a default configuration for the capacity). A new configuration file may be provided with data indicating a capacity higher than the initial (or default) song-holding capacity. Other features may be switched (typically on), such as enabling a feature such as access to music playlists on the portable media player computing device 102. For example, the "key" may be "playlist" and the "value" may be "off" or "on." In one example, where a default configuration is hard-coded, the presence of a configuration file effectively overrides the default configuration.

Figure 4:
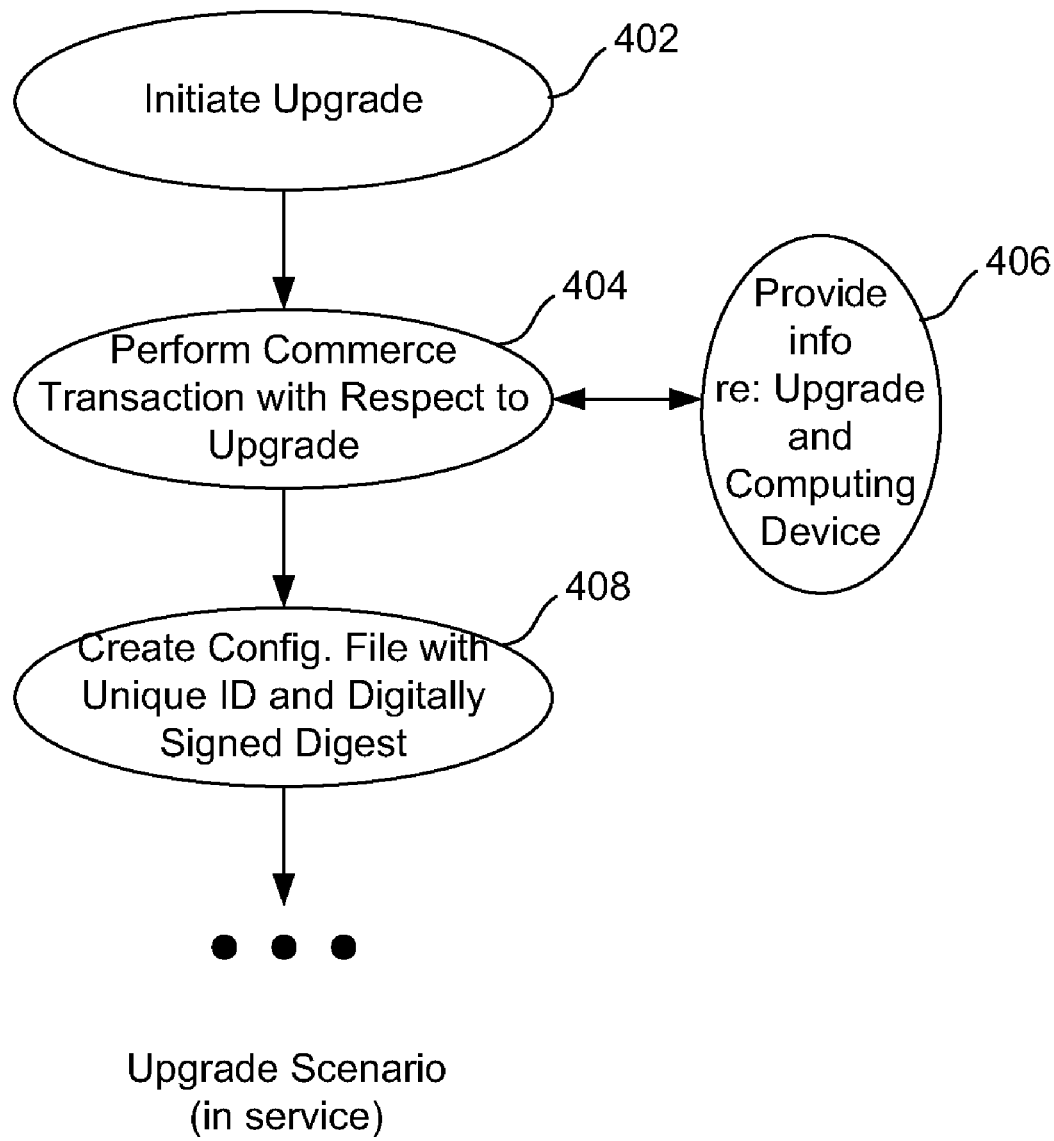
FIG. 4 illustrates an example high-level processing flow, with respect to the service, to accomplish a song-holding capacity upgrade.

Referring now specifically to FIG. 4, an example high-level processing flow is described, with respect to the service 104, to accomplish the song-holding capacity upgrade. At step 402, the upgrade process is initiated. For example, this may be a result of a user interacting with the media management application on the client computer 106. For example, the initiation may be a user activating a user interface item, such as clicking an icon.

In other examples, the user initiation may be as a result of interacting with an application on the computing device 102 to be upgraded. For example, the computing device 102 may be a mobile telephone that is configured to also operate as a portable media player. The user may interact with the portable media player application, which then wirelessly (e.g., via a cellular or other wireless connection) interacts with the service.

As another example, the initiation may be a result of the user attempting to perform an action for which the upgrade (or some other reconfiguration) is required. For example, the user may be attempting to download a twenty-sixth song into the portable media player computing device 102, where the data in the configuration is such that the song-holding capacity is twenty-five songs.

As yet another example, using the iPod/iTunes environment as an example, the upgrade may be initiated via a Music Store page accessed over the network using the iTunes™ desktop application. When the mobile telephone is connected to the desktop computer for the first time, the desktop application contacts the Music Store, which associates the phone with the user's Music Store account. When the user subsequently visits the Music Store, the Store can display a button or link that the user can click to initiate the upgrade for the phone.

At step 404, a commerce transaction is performed with respect to the upgrade. Thus, for example, the user may provide a credit card number or otherwise indicate payment for the upgrade. For example, the user may have "song credits" or a prepaid card. At step 408, the service 104 operates to create the configuration file (with respect to the unique ID) indicating the upgraded song-holding capacity (or other upgraded features) as well as generating a digital signature for the configuration file as shown, for example, in FIG. 3-1. In some examples, information may be provided to the user regarding the configuration change, such as a warning that a higher capacity flash memory may be required to actually hold the higher number of songs.

Figure 5:
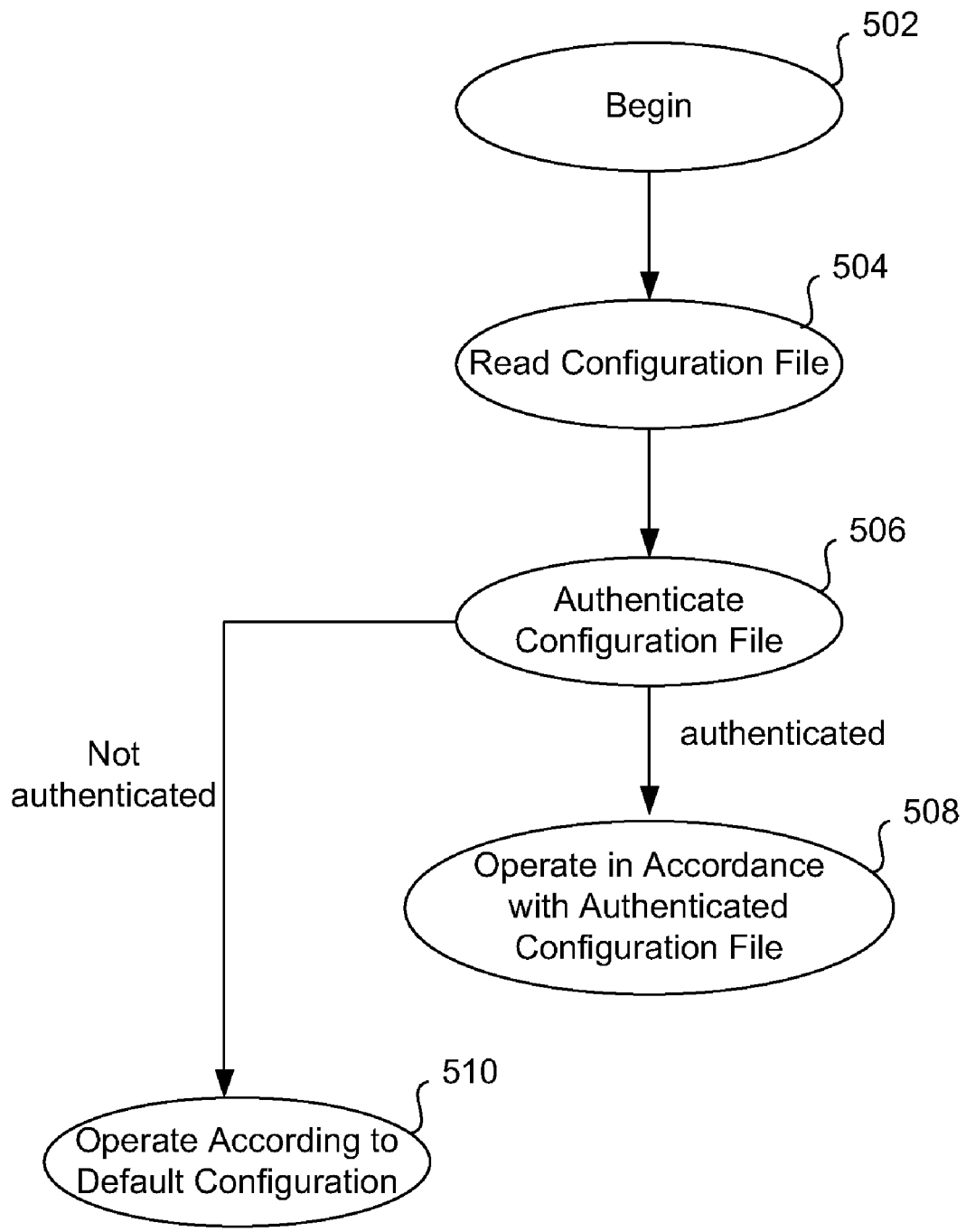
FIG. 5 is a flowchart illustrating processing in the computing device to utilize a configuration file.
Figure 6:
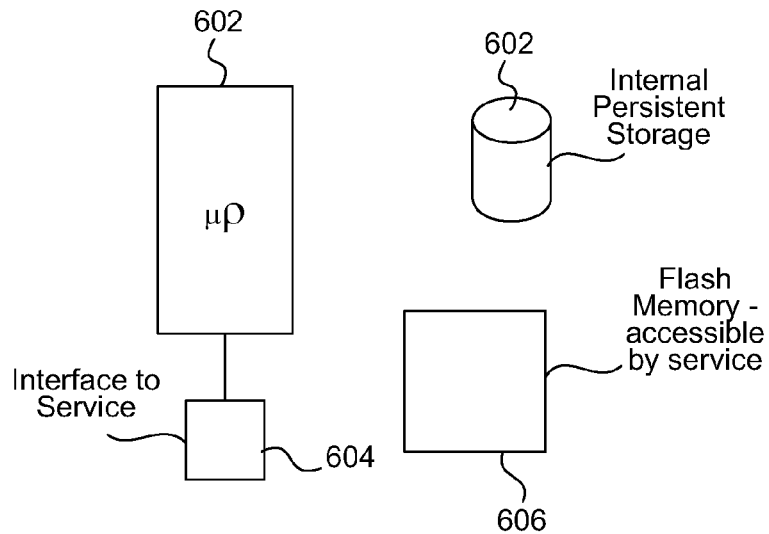
FIG. 6 illustrates an example memory organization of a computing device.

FIG. 5 is a flowchart illustrating processing in the computing device 102 to utilize the configuration file. The processing begins at step 502. At step 504, the configuration file is read. At step 506, the configuration file is authenticated as shown, for example, in FIG. 3-2. If the configuration file can be authenticated, then at step 508, the computing device 102 operates in accordance with the authenticated configuration file. If the configuration file cannot be authenticated, then at step 510, the computing device 102 retrieves a backup copy of the configuration file and digital certificate (discussed in greater detail later, with reference to FIGS. 6 and 7) or operates in accordance with a default configuration.

Thus, for example, the configuration file may indicate that the portable media player computing device 102 may hold fifty songs, instead of the default twenty-five songs. The computing device 102 operating in accordance with this indication would have the capability of accessing greater than twenty-five songs from its internal memory, up to the fifty songs allowed by the configuration.

The configuration file indicating the upgraded song-holding capacity may be provided back to the service 104, from the computing device 102 (for example, see arrow 212 in FIG. 2). Processing of the service 104 may operate according to the FIG. 5 flowchart, where the step 508 "operate in accordance with the authenticated configuration file" (i.e., interoperate with the computing device based on the configuration file, as denoted by reference numeral 214 in FIG. 2). Thus, for example, the service 104 may not download songs to the portable media player computing device 102 if doing so would cause the number of songs stored in the portable media player computing device 102 to go above the capacity indicated by the configuration file.

Figure 7:
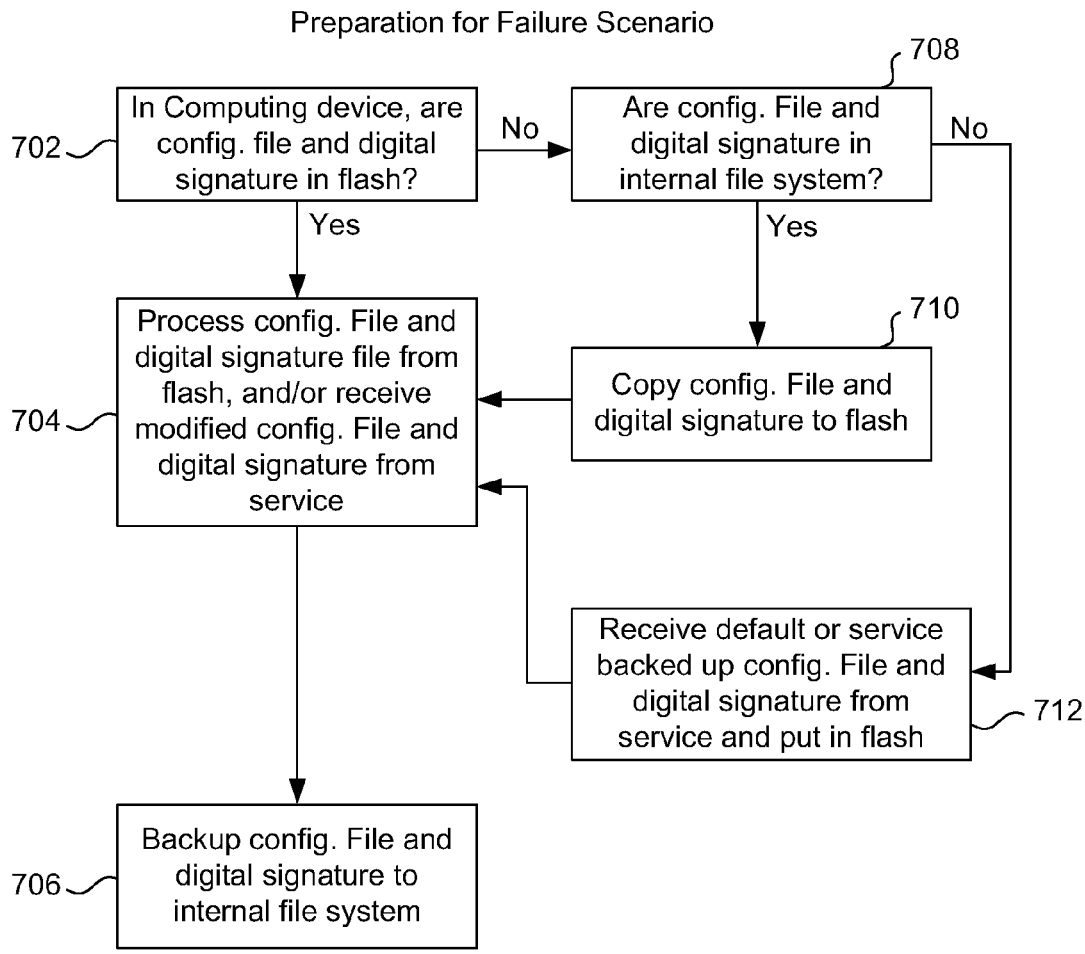
FIG. 7 illustrates a failure/backup scenario.

We now describe a failure/backup scenario, with reference to FIG. 7. As background, we first describe an example memory organization of a computing device 102, with reference to FIG. 6. The computing device 102 includes a microprocessor 602, with an interface 604 to the service 104. A flash memory 606 is accessible to the service 104 and the processor 602, but an internal persistent storage 608 is accessible only to the processor 602 (and not to the service 104). Typically, then, the configuration file is provided from the service 104 and stored onto the flash memory 606, accessible to the service 104.

We now turn to FIG. 7 to discuss the failure/backup scenario. At step 702, it is determined if the configuration file and digital signature are in the flash memory 606. If so, then at step 704, the configuration file and digital signature are processed from the flash memory 606 or a modified configuration file and digital signature are received from the service 104. At step 706, the configuration file and digital signature are backed up from the flash memory 606 to the internal persistent storage 608 of the computing device 102.

On the other hand, if at step 702 the configuration file and digital signature are not in the flash memory (for example, the flash memory may have been replaced), it is determined at step 708 whether the configuration file and digital signature are in the internal persistent storage 608. If so, then at step 710, the configuration file and digital signature are copied to the flash memory 606, and processing continues at step 704.

Otherwise, at step 712, a default configuration file and digital signature are obtained, or a service backed-up configuration file and digital signature are obtained (e.g., by referencing a purchase history to confirm that a user has actually paid for a particular configuration), and are stored into the flash memory 706. Then, processing continues at step 704.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of securely configuring a computing device, the method comprising:

receiving a configuration indication into the computing device, the configuration indication including a configuration file and an encrypted digest of the configuration file, the encrypted digest being formed by producing a digest of the configuration file and encrypting the digest, the configuration file including a unique identifier associated with the computing device;

verifying, at the computing device, that the received configuration indication is authentic including:
generating a digest of the configuration file;
decrypting the received encrypted digest; and
comparing the generated digest with the decrypted digest;

operating or interoperating with the computing device in accordance with the received configuration file when the generated digest and the decrypted digest match; and operating or interoperating with the computing device in accordance with another configuration file of the computing device when the generated digest and the received decrypted digest do not match, wherein the received encrypted digest is encrypted using a private key of a public/private key pair;

wherein the decrypting of the encrypted digest uses a public key of the public/private key pair, and wherein the verifying comprises comparing the unique identifier provided in the configuration file to a unique identifier previously assigned to the computing device.

2. The method of claim 1, wherein the configuration indication is a collection of data indicating a configuration for at least a plurality of operations of the computing device.

3. The method of claim 2, wherein the collection of data includes a collection of key/value pairs.

4. The method of claim 3, wherein the collection of key/value pairs is defined by a markup language.

5. The method of claim 4, wherein the markup language is an extensible markup language.

6. The method of claim 4, wherein the collection of data includes a binary encoding of the markup language.

7. A method of securely configuring a computing device, the method comprising:
- receiving a configuration indication into the computing device, the configuration indication including a configuration file and an encrypted digest of the configuration file, the encrypted digest being formed by producing a digest of the configuration file and encrypting the digest, the configuration file including a unique identifier associated with the computing device;
- verifying, at the computing device, that the received configuration indication is authentic including:
  - generating a digest of the configuration file;
  - decrypting the received encrypted digest; and
  - comparing the generated digest with the decrypted digest;
- operating or interoperating with the computing device in accordance with the received configuration file when the generated digest and the decrypted digest match; and
- operating or interoperating with the computing device in accordance with another configuration file of the computing device when the generated digest and the received decrypted digest do not match,
- wherein the configuration indication and the encrypted digest are generated by a service,
- wherein the configuration indication and the encrypted digest are provided from the service to the computing device, for the configuration indication and the encrypted digest to be received by the computing device,
- wherein further comprises providing the configuration indication and the encrypted digest from the computing device back to the service, and wherein interoperating with the computing device in accordance with the received configuration indication includes the service interoperating with the computing device in accordance with the configuration indication provided back to the service.

8. The method of claim 7, wherein the received encrypted digest is created in association with a provider of the configuration indication based on a private key of a public/private key pair; and
- wherein the decrypting of the encrypted digest uses a public key of the public/private key pair.

9. The method of claim 8, wherein the verifying comprises:
- comparing the unique identifier provided in the configuration file to a unique identifier previously assigned to the computing device.

10. The method of claim 7, further comprising:
- performing an action by a user that causes initiation of the configuration indication generating step.

11. The method of claim 10, wherein:
- the action by the user is with respect to the computing device,
- the action by the user is with respect to the service,
- the service includes a user application executing on a client computer and server-based functionality, and
- the action by the user with respect to the service is an action by the user with respect to the user application executing on the client computer.

12. The method of claim 11, wherein:
- the server-based functionality includes commerce functionality to regulate the user application, including regulating whether the user application can generate the configuration indication and the encrypted digest.

13. The method of claim 12, wherein:
- the commerce functionality includes functionality to receive remuneration in exchange for allowing the user application to generate the configuration indication and the encrypted digest.

14. The method of claim 10, wherein:
- the action corresponds to a direct request by a user to request a new or modified configuration.

15. The method of claim 10, wherein:
- the action corresponds to a request by a user to perform an action, wherein the action requires a new or modified configuration.

16. The method of claim 15, wherein:
- the action by the user with respect to the computing device causes the service to generate the configuration indication and the encrypted digest.

17. The method of claim 16, wherein:
- the computing device is connected to the service via a wireless network.

18. The method of claim 17, wherein:
- the wireless network is provided by a wireless carrier; and
- the service is provided in cooperation with the wireless carrier.

19. The method of claim 18, wherein:
- the computing device has wireless communication functionality;
- the wireless network is a network provided by a mobile telephone service provider; and
- the service is provided in cooperation with the mobile telephone service provider.

20. A non-transitory computer readable medium including at least computer program code stored therein for securely configuring a computing device, the non-transitory computer readable medium comprising:
- computer program code for receiving a configuration indication at the computing device, the configuration indication including a configuration file and an encrypted digest of the configuration file, the encrypted digest being formed by producing a digest of the configuration file and encrypting the digest, the configuration file including a unique identifier associated with the computing device;
- computer program code for verifying that the received configuration indication is authentic, the verifying including at least generating a digest of the configuration file, decrypting the received encrypted digest, and comparing the generated digest with the decrypted digest;
- computer program code for causing the computing device to operate in accordance with the received configuration file when the generated digest and the decrypted digest match; and
- computer program code for causing the computing device to operate in accordance with another configuration file of the computing device when the generated digest and the received decrypted digest do not match,
- wherein the received encrypted digest is encrypted using a private key of a public/private key pair;
- wherein the decrypting of the encrypted digest uses a public key of the public/private key pair, and wherein the computer program code verifying comprises computer program code for comparing the unique identifier provided in the configuration file to a unique identifier previously assigned to the computing device.

* * * * *